(12) United States Patent
Heath et al.

(10) Patent No.: US 10,789,432 B2
(45) Date of Patent: *Sep. 29, 2020

(54) TRACKLETS

(71) Applicant: Vium Inc, San Mateo, CA (US)

(72) Inventors: Kyle Howard Heath, Menlo Park, CA (US); Daniel J. Ford, San Francisco, CA (US); Youssef Barhomi, Arlington, MA (US); Pablo Jadzinsky, Palo Alto, CA (US); Jonathan Betts-LaCroix, Belmont, CA (US)

(73) Assignee: Vium, Inc, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,519

(22) Filed: Dec. 20, 2017

(65) Prior Publication Data

US 2019/0188425 A1    Jun. 20, 2019

(51) Int. Cl.
| | | |
|---|---|---|
| *G06K 7/08* | (2006.01) | |
| *G06K 7/10* | (2006.01) | |
| *A01K 29/00* | (2006.01) | |
| *G06K 19/077* | (2006.01) | |
| *A01K 1/03* | (2006.01) | |
| *A01K 11/00* | (2006.01) | |

(52) U.S. Cl.
CPC .......... *G06K 7/10009* (2013.01); *A01K 1/031* (2013.01); *A01K 11/004* (2013.01); *A01K 29/005* (2013.01); *G06K 19/07758* (2013.01)

(58) Field of Classification Search
CPC .......... G06K 7/0008; G06K 7/100089; G06K 7/10009
USPC ........................................... 235/451
See application file for complete search history.

(56) References Cited

U.S. PATENT DOCUMENTS

| | | | |
|---|---|---|---|
| 8,688,184 B2* | 4/2014 | Truitt ................ | A61B 5/14552 600/323 |
| 9,253,963 B2* | 2/2016 | Mays ..................... | A01K 11/00 |
| 9,485,966 B1* | 11/2016 | Betts-Lacroix ...... | A01K 29/005 |
| 9,526,437 B2* | 12/2016 | Tupin, Jr. ............. | A01K 27/009 |
| 2017/0000905 A1* | 1/2017 | Betts-Lacroix ...... | G01N 33/493 |

* cited by examiner

*Primary Examiner* — Daniel St Cyr
(74) *Attorney, Agent, or Firm* — Kim Rubin Patent Agent

(57) ABSTRACT

The field of this invention is recording motion of an animal, uniquely identifying the animal, and recording an activity of that animal. Motions of animals on a path when the animal is or can be uniquely identified are tracklets. Tracklets begin and end at ambiguation events, where these are defined as locations and times of an animal where it cannot be uniquely identified. A first animal may be uniquely identified by first identifying all other animals in the first animal's environment. Animal identification may be after the end of a tracklet. Embodiments use optical flow analysis from video of an animal's environment. Embodiments record an animal's activity on tracklets and then use that activity to measure animal health or use that activity as data for a study using animals.

2 Claims, 5 Drawing Sheets

TRACKLETS

FIELD OF THE INVENTION

The field of this invention is unique identification of an animal from a plurality of animals. More specifically, identification of a unique rodent in a cage, such as in a vivarium, where multiple animals may be in a single cage.

BACKGROUND OF THE INVENTION

Animals, including research animals, such as mice or rats, are typically housed in cages in a vivarium. If multiple animals are placed in a single cage, the animals and the cages are said to be, "multihoused."

Such animals, in a study, are examined or monitored, either manually or electronically, to detect and quantify various behaviors, characteristics, or, "phenotypes," identified individually or in aggregate, herein as, "behaviors." Behaviors of animals may be determined by various sensors, either in or outside of the cage. It is critically important that such behaviors be associated with a specific animal in a cage. Various methods of such identification are used in the art, such as RFID tags, which may be implanted or attached to the animal; tattoos, such as tail tattoos; and ear notches.

However, a weakness of such known techniques is that they are frequently not available or not definitive at all times. For example, an animal may be burrowed under bedding. Or, it may be nighttime and visible light is not available. Or, less than one or more than one animal may be in range of an RFID reader.

SUMMARY OF THE INVENTION

Embodiments overcome limitations in the prior art.

One method of identifying an animal uniquely is to first identify it uniquely at one place in the cage or at one point in time, and then follow that animal, such as by using automated visual analysis from camera frames. Another method is to identify uniquely all of the other animals in a cage, thus leaving only one possible animal as the animal in question.

A first embodiment of this invention identifies a portion of an animal path we call a, "tracklet." Both tracks and tracklets comprise both a spatial path, either in two-dimensions or three-dimensions, and time. Such a track or tracklet may be represented as continuous data, such as using B-splines. Such a track or tracklet may be represented as a series of discreet data values. In general, such a distinction is not relevant to claims and thus words describing such a track, tracklet or path should be construed, unless otherwise clear from the context, as including both continuous data and discreet data representations. For convenience in discussion, we identify a, "path" as comprising spatial data, not necessarily associated with times. A "track" may be viewed as a path with times of motion of an animal. A tracklet is a specific portion of a track, where a unique identity of an animal is known throughout the tracklet.

Tracklets begin and end at a corresponding pair of, "ambiguation events." An ambiguation event is one or more spatial locations and times where not all animals in a cage are identified uniquely. For example, two animals may both be burrowed close together. As one animal emerges from the burrow, it may not be possible to know, at least right away, which of the two animals it is. As another example, two animals may be close together. Although both animals are visible, they cannot be continuously resolved sufficiently, such as with a limited resolution video camera, to confidently disambiguate their identity. Ambiguation events may be any length of time.

An animal in a tracklet may be identified at the start of the tracklet, some time during the tracklet, or after the tracklet. That is, first a portion of an animal track is identified where that portion is confidently limited to a single animal. Then, at some point along that portion of the animal track, that one animal is identified, thus identifying uniquely the animal for the entire tracklet.

Embodiments require automatically identifying at least a portion of path of an animal. That is, animals must be first "identified as an animal," and then, "followed," in the cage.

Tracklets may be used to associate sensor data with a particular animal. For example, an animal may be in an exercise wheel. To properly record the exercise of that animal it is necessary to know which animal is in the wheel. It may not be possible to determine the identity of the animal while it is in the wheel. However, if a single animal can be followed into the wheel and out of the wheel, and the wheel never had more than one animal in it, then the time in the wheel may be part of a tracklet, if the animal can be uniquely identified either before entering the wheel or after, and there is no intervening ambiguation event.

Embodiments include the use of tracklets to identify animals and to associate sensor data with a particular animal.

BRIEF LIST OF FIGURES

DETAILED DESCRIPTION OF THE INVENTION

Figure 1:
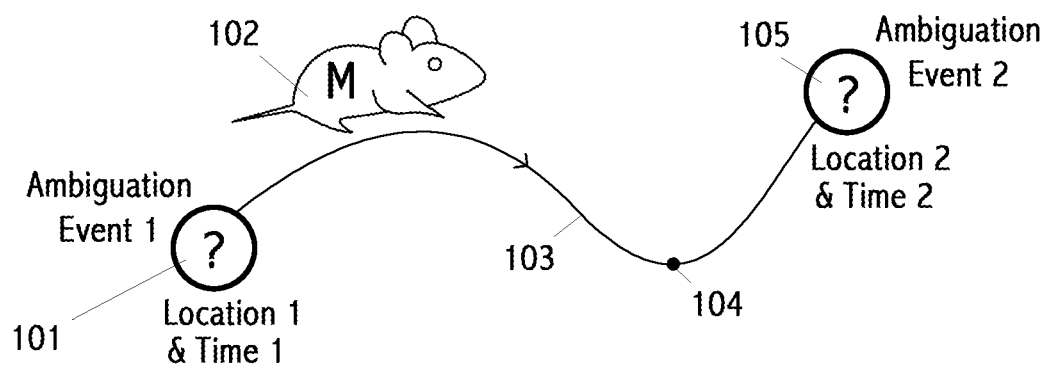
FIG. 1 shows a symbolic representation of one tracklet between two ambiguation events.

Embodiments, scenarios, examples, and drawings are non-limiting.

A tracklet always begins and ends at a pair of ambiguation events. There cannot be an ambiguation event in the middle of a tracklet because there would be two tracklets. An ambiguation event is when an as-yet unidentified animal of interest cannot be uniquely differentiated from all other animals. Note that ambiguation events may not be determined or determinable at the moment of the event. The beginning and end of available animal data, such as a video frame, is considered an ambiguation event, because with no data, there is logically no way to differentiate animals.

A tracklet may be viewed as "closed," that is, including both ambiguation events, or "open," that is, excluding both ambiguation events, or a mix with one open and one closed end. In general this makes little difference. For example, the difference between one end of the tracklet as open or closed may be a single video frame. Embodiments of tracklets, unless otherwise clear from the context, include both closed and open endpoints.

An example of an open end of a tracklet is when video first starts. Frame "zero," which does not exist, is, by nature, an ambiguation event. It may be that at the very first frame, all animals in a cage are identified or identifiable. For example, there may be two animals, both wearing ID tags on their ears, with the ID tags being visible and readable in the first video frame. The tracklet then begins at frame one.

An example of closed end of a tracklet is when two animals are so close together they cannot be differentiated, in a cage with exactly two animals. Nonetheless, it is known that there are exactly two animals at the same location and time, and therefore any animal of interest in the cage must be at that location at that time. Thus, a video frame at that moment is an ambiguation event and may be included in a tracklet.

Note that for two or more animals in a cage, there may be more than one overlapping or concurrent tracklets, one for each animal.

There are numerous ways to track an animal, such as optical flow using video as input. Another method uses outline analysis. For most embodiments, a specific method of tracking an animal along a path, segment, or tracklet is not relevant.

There are numerous ways to ID an animal, such as machine recognizable ear tags, tail tattoos, RFID, weight, color or behavior, as non-limiting examples. Each method as benefits and weaknesses. A large number of behaviors may potentially be used for unique animal identification, or as part of unique animal identification. For most embodiments, a specific method of identifying an animal along a path, segment, or tracklet is not relevant.

It is necessary that the confidence of an animal ID be high. Even a small number of errors can throw off study results and may invalidate an entire study. While it is unlikely that there is ever 100% confidence in animal ID in a multihoused cage, we assume that there is a confidence threshold, which should be quantifiable. Below that threshold we say that ID is indeterminate or undetermined; at or above that threshold we say that an ID is known, determinate, or determined. Note that animal ID may be determined after the fact. For example, video and sensor data for a cage may be recorded, and then later analyzed. As another example, an unidentified animal may be followed along a path for a long time or distance in a cage. At some late point in the path the animal is identified; perhaps it moves past a short-range RFID reader, for example. Then, the entire path between its two ambiguation event endpoints is a tracklet.

A method of animal ID is by exclusion. That is, if the identity of all animals in a cage is known except for one animal of interest, then the ID of that one animal of interest is also known.

Turning now to FIG. 1, we see an exemplary tracklet 103. The tracklet begins at or immediately after the starting ambiguation event 101. This event has a location and time. The location may be a point or a region. The time may be an instant or a range. The location may be in two dimensions, such as on the floor of an animal cage. The location may be in three dimensions, such as being able to include climbing structures in a cage. Ambiguation events are shown in drawings as a circle with an interior question mark. The tracklet ends at or immediately before ambiguation event 105, which also has an associated location and time. A tracklet may be viewed as an animal path, or a path segment, that has no intervening ambiguity events. If there were such an intervening ambiguity event, then there would be two tracklets instead of one. The figure shows one animal 102, here identified tentatively as animal M, that moves along the tracklet from event 101 to event 105. A tracklet may have only one animal, although tracklets for two different animals may cross or overlap. 104 shows a location on the tracklet where animal M is identified. Such identification must be unique in the environment, such as a cage. Identification uniquely within a cage is typically also unique identification within a study because study data identifies which animals are in which cage. It may not be necessary to know either the exact location of the exact time of animal ID event 104— only that it be confidently known that the animal ID event 104 is for animal M that is moving on or did move on the tracklet.

Note that although ambiguation events such as 101 and 105 occur at specific point in time, identification and association actions, including method steps, may occur either in real-time or may occur at any later time. For example, sensors, including cameras, in a cage may record continuously. Then, at a later time, sensor data and video frames are analyzed. That analysis may find events 101, 105 and 104, and create the tracklet 103, and determine that some mouse M followed the tracklet, and then event 104 allowed mouse M to be uniquely identified. It is necessary to consider both the times when events occurred and also the times when such events were identified.

Figure 2:
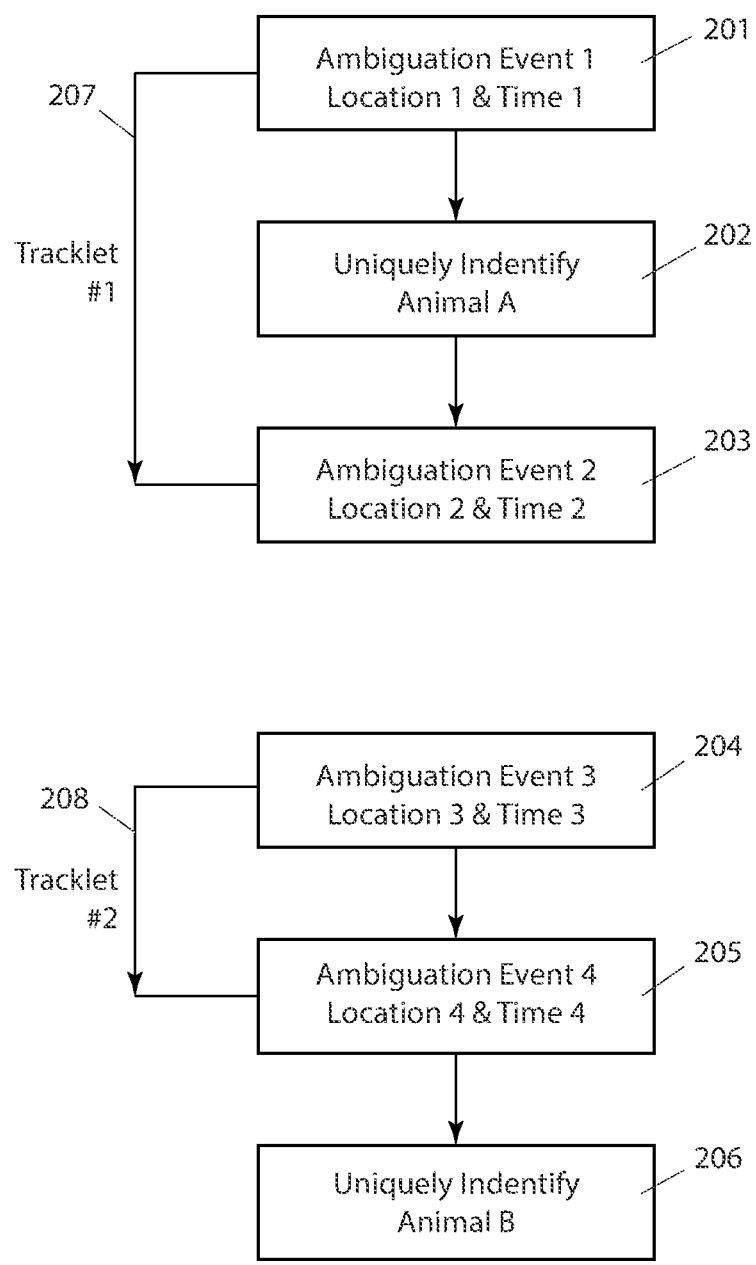
FIG. 2 shows multiple times when an animal may be uniquely identified in a tracklet.

Turning now to FIG. 2, we see two possible event orders. The first order, 201, 202 and 203, shows that an animal A was uniquely identified 202 after the start 201 of the tracklet 207, and before the end 203 of tracklet 207. The second event order, 204, 205 and 206, shows that an animal B was not uniquely identified 206 until after the end 205 of its tracklet, 208. In this Figure, time moves from the top of the page towards the bottom.

Figure 3:
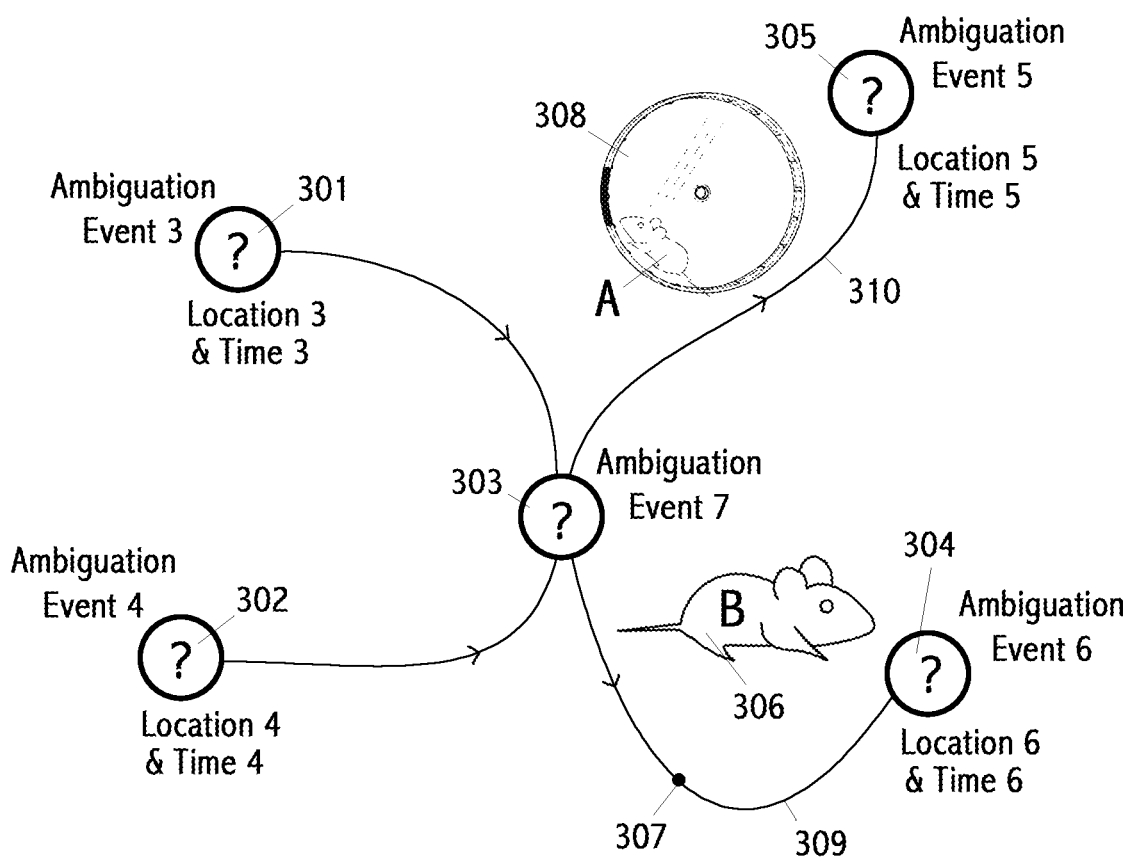
FIG. 3 shows an exemplary progression of tracklet identification.

Turning now to FIG. 3, we see two different animals on a total of four tracklets, with five total ambiguation events. We might consider the path of an animal B, 306, from ambiguation event 301 to 304; and the path of an animal A, shown in exercise wheel 308, from ambiguation event 302 to ambiguation event 305. However, the paths of animals A and B cross at point 303 where they cannot confidently be distinguished. Thus, it is not possible to tell which animal actually moved 301 to 303 and which animal moved from 302 to 303. Thus, the tracklets from 301 to 303 and from 302 to 303 are not particularly interesting because we cannot confidently associate those paths with unique animals. For some studies, any sensor data associated with animals on these tracklets is not interesting because it cannot be confidently associated with a specific animal.

What is more interesting are the tracklet 309 from ambiguation event 303 to ambiguation event 304 and the tracklet 310 from ambiguation event 303 to ambiguation event 305. Here, at point 307 we are able to unique identify animal B, on tracklet 309. If there are only two animals in a cage, the identification of mouse B at the point (and time) 307 allows us to know that mouse A is the other mouse in the cage. Mouse A is shown exercising in wheel 308, during the tracklet 310. Even though we were not able to identify directly mouse A at any time from ambiguation event 303 to ambiguation event 305, we confidently know the unique identity of mouse A and are thus able to record the exercise activity 308 with specific and uniquely identified mouse A. A cage is not shown in the schematic view of this Figure.

Figure 4:
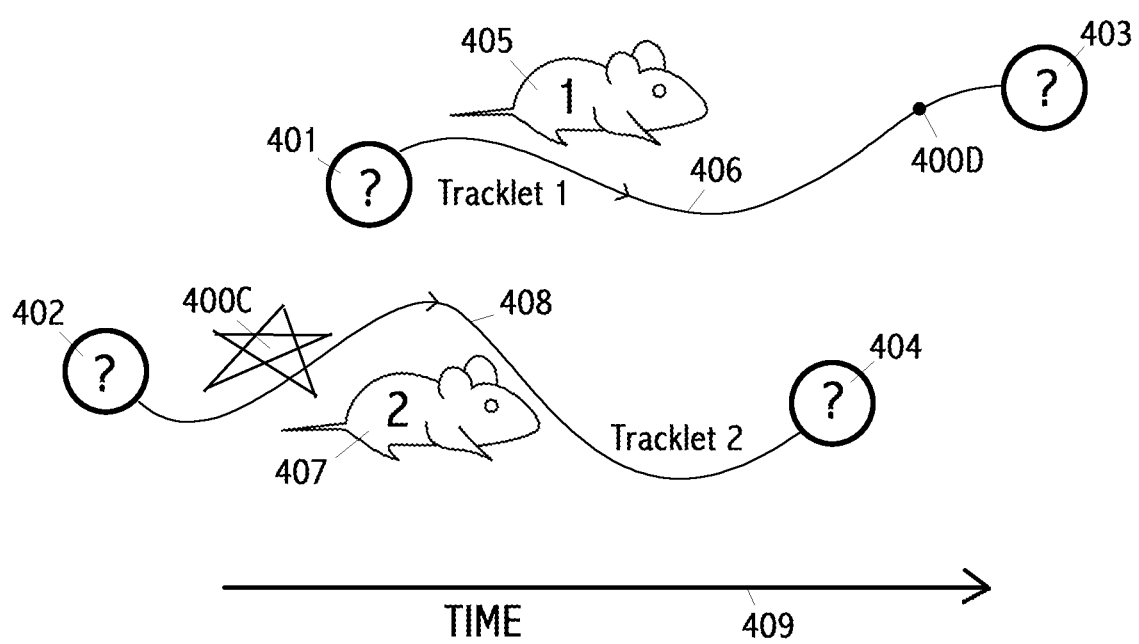
FIG. 4 shows a time line of two tracklets with activity.

Turning now to FIG. 4, we see a method of identifying an animal and associating an event with a specific animal. In this Figure, there is a timeline 409; time moves from left to right. Animal 1, 405, not yet uniquely identified, moves on tracklet 1, 406, from ambiguation event 401 to ambiguation event 403. Overlapping in time with tracklet 1, mouse 2, 407, not yet uniquely identified, moves on tracklet 2, 408, from ambiguation event 402 to ambiguation event 404. Mouse 2 performs some action 400C along tracklet 2, 408. At the time of action 400C we do not know the unique identity of mouse 2. In fact, we still do not know the unique identity of mouse 2 at the end of tracklet 2, ambiguation event 404. In the meantime, mouse 1, 405, on tracklet 406, becomes uniquely identified at location and time 400D. Thus, we know the unique identity of mouse 1 for the entire tracklet 1, 406. Because tracklets 1 and 2, 406 and 408 respectively, overlap in time, if there are only two mice in a cage we then know the unique identity of mouse 2, 407, and may then associated activity 400C with that uniquely identified mouse.

Note that the key identification event, 400D, occurred after the activity 400D and indeed after the end of tracklet 2, 408, at ambiguation event 404.

This method is easily extended to three or more mice in one environment, such as a cage. Knowing the identity of all animals except one in a cage, at a given moment in time, also uniquely identifies the remaining unidentified animal in the cage.

Figure 5:
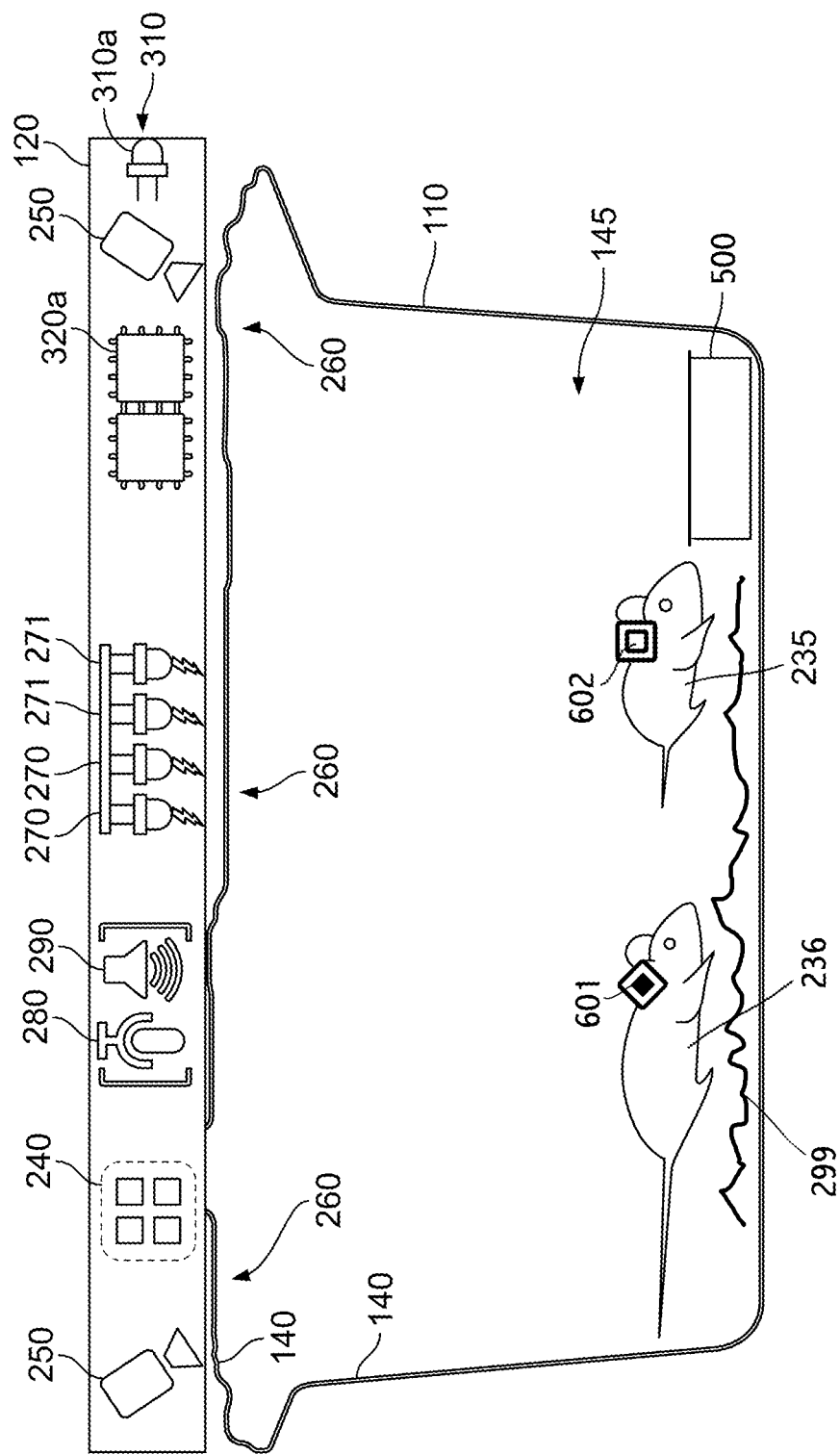
FIG. 5 shows an exemplary cage with two animals.

Turning now to FIG. 5, we see a schematic side view of a cage with two animals each wearing an identifying ear tag, plus sensors in the cage to read the tags and record activity. The tags may be on either one or two ears of each animal. The periphery of the cage, often constructed from clear plastic, is shown as 110 and 140, for the outside and inside surfaces respectively. The interior of the cage, ideally sterile, per the definition of sterile in this specification, is 145. Thus the sterile border is between 140 and 110. Bedding area is shown 299. A scale, typically a wireless, sterilizable, re-useable scale is shown 500. The scale may be below a water bottle, not shown, to encourage mice to climb on the scale regularly. Exercise equipment is not shown. 260 shows in three places clear areas at the top of the cage through which cameras 250 may view the inside of the cage, and through which visible light and infrared light, from LEDs 270 and 271, respectively, may enter the cage. Light from such LEDs 270 and 271 may be required or used conveniently to read ID tags. IR light is appropriate as many animals, including mice are nocturnal. Providing visible light to the animals during their natural activity period either causes them to change their circadian activity or it disturbs their natural activities and may cause stress, or all of these. Cages may be disposable or sterilized between studies. Ideally, and key to some embodiments, is that there are no electrical penetrations of the cage periphery, 110 and 140. Cameras, which may be still or video, monochrome, color or infrared (IR), multiple or single, are shown 250. Ideally only a single camera is used. 280 and 290 show respectively a microphone and speaker, which may be used for either ambient (vivarium) or in-the-cage audio use. 240 shows exhaust air sensors, such as temperature, humidity, ammonia concentration, and the like. 320a shows local processing electronics, which may include CPU, analog and digital processing, including video image processing, storage and communication, in any combination. 310a shows an LED pointing away from the cage, which may be used as an indicator for humans, such as the cage needs attention, or as an optical communications element. Other communication elements, not shown, may be wireless or wired. 310 shows a base, enclosure or "slab" that contains some or all of the electronics and sensors. Ideally this slab 310 is separate from the cage 110, so that cages may be easily moved, removed swapped, or replaced without disturbing the electronics, and similarly, all of the electronics in the slab 310 may easily be installed, serviced, updated, or swapped, without tools, as slab units without disturbing the cage or its animals. Cages may slide in and out of their holding racks on rails, while the slap is mounted overhead each cage. Similarly, slabs may sit simply on supports, with electrical connection via a connector or fingers. In this way, both the electronics and the cages may be removed and replaced without disturbing the other. Other sensors may also or alternatively be used, as discussed below. Not shown in this Figure are supply and exhaust air ducting. Husbandry elements monitored by the sensors in slab 310 or by sensors elsewhere.

Two animals are shown in FIG. 5 as 235 and 236. Here, there are two mice. As described above and below, embodiments may use a wide range of animals for studies and a wide range of environments besides cages, including animal in a zoo or in the wild. The identities of the two mice, 235 and 236, are distinguished in different embodiments by identification devices, such as ear tags, here shown as 601 and 602. Tags may be read using, in part, one or two cameras 250.

Microphone 280 may receive either human-range audible vocalizations or ultrasonic vocalizations, or both. This microphone may also pickup spoken information from technicians in the vivarium. Speaker 290 may be used to provide audible information to a vivarium technician, background sounds that are husbandry compatible, including white noise, or non-husbandry stimulation.

The cage hardware as shown is capable of providing some non-husbandry stimulation, such as sound and light.

Either LEDs 270 and 271 may provide circadian light for the animals in the cage, or such lighting may be provided generally within the vivarium, not shown.

FIG. 5 is schematic only. Actual sensors and cage design may differ substantially from the shapes and locations shown. Embodiments may use more elements or fewer elements than shown. Husbandry elements such as a water bottle, food tray, exercise equipment, nesting locations, chewable objects, and the like are not shown. Exercise equipment or cage furniture, such a running wheel or climbing ladder, are not shown in this Figure. Note that this cage has no electronic penetrations.

Note that the tags 601 and 602 may be part of a set of two tags or patterns. Their purpose, generally, is to uniquely identify animals in a single multihoused cage. For unique identity of animals within one study, or one vivarium, additional identification is typically needed, such as a cage ID.

Embodiments are specifically claimed for devices and systems that use methods described, including but not limited to any combination of cameras, ear tags, scales, cages, vivariums and animal studies.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substitution thereof to any and all other device claims, including all combinations of elements in device claims.

We claim:

1. A method of associating sensor data with a first animal in an environment with multiple animals, comprising a device or a cooperatively communicating multiple devices for performing the steps of: identifying a first ambiguation event involving the first animal not yet identified from the multiple animals; identifying a second ambiguation event involving the first animal; wherein the second event occurs after the first event and there is no ambiguation event involving the first animal in between the first and second ambiguation events; identifying a continuous first animal path between the first and second ambiguation events; identifying a unique identity of the first animal, distinct from all other animals in the environment, at any point in the first animal path; collecting, communicating, and storing sensor data associated with the first animal; wherein the sensor data was collected in real time between the first and second ambiguation events; associating the sensor data with the unique identity.

2. A method of recording animal activity of an active animal in an environment with multiple animals, comprising a device or cooperatively communicating multiple devices for performing the steps of:
[A] identifying automatically a start of a first path of a first animal path beginning at a first ambiguation event; wherein the first animal is not yet identified; wherein the first path and the first animal are in the environment with multiple animals;
[B] identifying automatically a start of a second path of a second animal path beginning at a second ambiguation event; wherein the second animal is not yet identified;
[C] observing and recording automatically, an activity of the second animal, wherein the second animal is not yet identified;
[D] identifying the first animal with a first animal identity;
[E] assigning a second animal identity to the second animal; wherein the second animal identity is an identity of an animal in the environment wherein all animals in the environment, except the second animal, have known animal identities at the start of the assigning;
[F] identifying automatically an end of the first path at a third ambiguation event;
[G] identifying automatically an end of the second path at a fourth ambiguation event; wherein the first path and the second path are both free of any ambiguation events between their respective start and end ambiguation events; wherein step [C] occurs after the second ambiguation event and before the fourth ambiguation event; wherein the second ambiguation event occurs after the first ambiguation event and before the third ambiguation event; wherein an ambiguation event is a time and a location within the environment wherein it is not possible to automatically determine an identity of at least one animal at the ambiguation event; wherein the recorded animal activity of the active animal is the observed and recorded activity from step [C] and the active animal comprises the second animal identity.

* * * * *